(12) United States Patent
Hao

(10) Patent No.: US 9,904,117 B2
(45) Date of Patent: Feb. 27, 2018

(54) DISPLAY PANEL MANUFACTURING METHOD AND LIQUID CRYSTAL DISPLAY DEVICE

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 197 days.

(21) Appl. No.: 15/023,404

(22) PCT Filed: Feb. 22, 2016

(86) PCT No.: PCT/CN2016/074213
§ 371 (c)(1),
(2) Date: Mar. 21, 2016

(87) PCT Pub. No.: WO2017/124595
PCT Pub. Date: Jul. 27, 2017

(65) Prior Publication Data
US 2017/0322460 A1 Nov. 9, 2017

(30) Foreign Application Priority Data

Jan. 21, 2016 (CN) .......................... 2016 1 0041414

(51) Int. Cl.
*G02F 1/1337* (2006.01)
*G02F 1/1335* (2006.01)
(Continued)

(52) U.S. Cl.
CPC .... *G02F 1/133788* (2013.01); *G02F 1/13439* (2013.01); *G02F 1/133514* (2013.01);
(Continued)

(58) Field of Classification Search
CPC ......... G02F 1/133788; G02F 1/133514; G02F 1/134309; G02F 1/13439; G02F 1/13378; G02F 1/133509
See application file for complete search history.

(56) References Cited

U.S. PATENT DOCUMENTS 9,804,452 B2 * 10/2017 Kwon ............... G02F 1/134336
9,817,282 B2 * 11/2017 Yun ................... G02F 1/134309
9,817,286 B1 * 11/2017 Shin .................. G02F 1/134363

* cited by examiner

*Primary Examiner* — Anne Hines
(74) *Attorney, Agent, or Firm* — Andrew C. Cheng

(57) ABSTRACT

A display panel manufacturing method and a liquid crystal display device are disclosed. The method contains the following steps. Firstly, a first electrode plate, an opposing second electrode plate, and an array substrate in between are provided. Secondly, a first electrical field between the first and second electrode plates is produced, and a first photo-alignment on the first alignment film is conducted. Thirdly, a third electrode plate and an opposing color film substrate are provided. Fourthly, a second electrical field between the third electrode plate and the second transparent electrode is produced, and a second photo-alignment on the second alignment film is conducted. Finally, the array and color film substrates are joined together to form the display panel. The method is able to improve liquid crystal molecules' preset angles in the vertical direction, thereby enhancing the contrast of the display panel.

17 Claims, 6 Drawing Sheets

(51) Int. Cl.
*G02F 1/1343* (2006.01)
*G02F 1/1333* (2006.01)
(52) U.S. Cl.
CPC .................. *G02F 1/134309* (2013.01); *G02F 2001/133354* (2013.01)

DISPLAY PANEL MANUFACTURING METHOD AND LIQUID CRYSTAL DISPLAY DEVICE

BACKGROUND OF THE INVENTION

1. Field of the Invention

The present disclosure generally relates to display technologies, and particularly relates to a display panel manufacturing method and a liquid crystal display (LCD) device.

2. The Related Arts

Currently display panels of LCD-TVs mainly utilize Vertical Alignment (VA) and In Plane Switching (IPS) techniques. VA techniques further contains Multi-domain Vertical Alignment (MVA) and Patterned Vertical Alignment (PVA) techniques. These techniques suffer low aperture ratio, inferior contrast, slow response speed, and complicated process due to domain separators such as projections or gaps.

Photo alignment techniques mainly utilize alignment material that is sensitive to ultraviolet light and reliable. The liquid crystal panel thus made does not require domain separators, and has features such as high aperture ratio, superior contrast, and high response speed. The traditional drawbacks are therefore eliminated and these techniques become research focus of the related industry.

The alignment film of a LCD device requires an alignment process so as to effectively control the arrangement of liquid crystal molecules. The alignment process mainly contains Rubbing and Non-Rubbing types. The Rubbing-type process performs fixed-directional mechanical rubbing by applying a flannel roller against polyimide (PI) surface. The energy provided by the rubbing cases polymer molecules to align by extending their main chains, which in turn controls the alignment of the liquid crystal molecules. The advantages are that the process is conducted under normal temperature, short rubbing time, and high productivity. The disadvantages are that PI material is of high polarity and highly water-absorptive, un-uniform alignment due to deterioration during storage or transportation, low yield due to particles, residual static electricity, and brush marks resulted from rubbing. Non-rubbing-type process utilizes ultraviolet light to cause photopolymer monomer to react. The liquid crystal molecules interact with alignment film's surface molecules and, to achieve a steady state of minimum energy, liquid crystal molecules align along a direction that is under the greatest force defined by photo-alignment, thereby enhancing the overall performance. Non-rubbing-type process can avoid the undesirable problems to the alignment film resulted from mechanical rubbing.

SUMMARY OF THE INVENTION

The present disclosure teaches a display panel manufacturing method and a liquid crystal display device capable of improving liquid crystal molecules' preset angles in the vertical direction, thereby enhancing the contrast of the display panel.

The display panel manufacturing method contains the following steps: providing a first electrode plate, a second electrode plate opposing the first electrode plate, and an array substrate between the first and second electrode plates, where the array substrate contains a first transparent electrode and a first alignment film; producing a first electrical field between the first and second electrode plates perpendicular to the array substrate, and conducting a first photo-alignment on the first alignment film using an ultra-violet light whose polarization direction is parallel to the array substrate, where the first electrical field is an alternating current (AC) electrical field or a direct current (DC) electrical field; providing a third electrode plate and a color film substrate opposing the third electrode plate, where the color film substrate contains a second transparent electrode and a second alignment film, the second alignment film is positioned between the third electrode plate and the second transparent electrode; producing a second electrical field between the third electrode plate and the second transparent electrode perpendicular to the color film substrate, and conducting a second photo-alignment on the second alignment film using an ultra-violet light whose polarization direction is parallel to the color film substrate; and joining the array substrate and the color-film substrate to form the display panel.

The first and second electrode plates contains a number of strip-shaped electrodes. The strip-shaped electrodes on the first electrode plate one-to-one correspond to the strip-shaped electrodes on the second electrode plate, thereby forming a plurality of strip-shaped electrode pairs. The step of producing a first electrical field between the first and second electrode plates and conducting a first photo-alignment on the first alignment film contains the step of producing an electrical field between each strip-shaped electrode pair and conducting a third photo-alignment on the first alignment film.

The electrical fields between neighboring strip-shaped electrode pairs are of different strengths.

Neighboring strip-shaped electrode pairs correspond to different areas of the first alignment film and, in conducting the third photo-alignment, illuminated light is at an angle different from the array substrate.

The step of providing a third electrode plate and a color film substrate opposing the third electrode plate contains the step of providing a fourth electrode plate, a fifth electrode plate opposing the fourth electrode plate, and a color film substrate between the fourth and fifth electrode plates. The color film substrate contains a third alignment film. The step of producing a second electrical field between the third electrode plate and the second transparent electrode and conducting a second photo-alignment on the second alignment film contains the step of producing a third electrical field between the fourth and fifth electrode plates and conducting a fourth photo-alignment on the third alignment film.

The fourth and fifth electrode plates contains a number of strip-shaped electrodes. The strip-shaped electrodes on the fourth electrode plate one-to-one correspond to the strip-shaped electrodes on the fifth electrode plate, thereby forming a plurality of strip-shaped electrode pairs. The step of producing at least a third electrical field between the fourth and fifth electrode plates and conducting a fourth photo-alignment on the third alignment film contains the step of producing an electrical field between each strip-shaped electrode pair and conducting a fifth photo-alignment on the third alignment film.

Each of the first, second, third, fourth, and fifth electrode plates contains a transparent substrate and a transparent electrode layer on the transparent substrate.

The present disclosure teaches another display panel manufacturing method containing the steps of: providing a first electrode plate, a second electrode plate opposing the first electrode plate, and an array substrate between the first and second electrode plates, where the array substrate contains a first transparent electrode and a first alignment film; producing a first electrical field between the first and second electrode plates, and conducting a first photo-alignment on the first alignment film; providing a third electrode plate and a color film substrate opposing the third electrode plate, where the color film substrate contains a second transparent electrode and a second alignment film, the second alignment film is positioned between the third electrode plate and the second transparent electrode; producing a second electrical field between the third electrode plate and the second transparent electrode, and conducting a second photo-alignment on the second alignment film; and joining the array substrate and the color-film substrate to form the display panel.

The first and second electrical fields are AC electrical fields or DC electrical fields. The first electrical field is perpendicular to the array substrate and the second electrical field is perpendicular to the color film substrate.

The first photo-alignment utilizes a ultra-violet light whose polarization direction is parallel to the array substrate and the second photo-alignment utilizes a ultra-violet light whose polarization direction is parallel to the color film substrate.

The first and second electrode plates contains a number of strip-shaped electrodes. The strip-shaped electrodes on the first electrode plate one-to-one correspond to the strip-shaped electrodes on the second electrode plate, thereby forming a plurality of strip-shaped electrode pairs. The step of producing a first electrical field between the first and second electrode plates and conducting a first photo-alignment on the first alignment film contains the step of producing an electrical field between each strip-shaped electrode pair and conducting a third photo-alignment on the first alignment film.

The electrical fields between neighboring strip-shaped electrode pairs are of different strengths.

Neighboring strip-shaped electrode pairs correspond to different areas of the first alignment film and, in conducting the third photo-alignment, illuminated light is at an angle different from the array substrate.

The step of providing a third electrode plate and a color film substrate opposing the third electrode plate contains the step of providing a fourth electrode plate, a fifth electrode plate opposing the fourth electrode plate, and a color film substrate between the fourth and fifth electrode plates. The color film substrate contains a third alignment film. The step of producing a second electrical field between the third electrode plate and the second transparent electrode and conducting a second photo-alignment on the second alignment film contains the step of producing a third electrical field between the fourth and fifth electrode plates and conducting a fourth photo-alignment on the third alignment film.

The fourth and fifth electrode plates contains a number of strip-shaped electrodes. The strip-shaped electrodes on the fourth electrode plate one-to-one correspond to the strip-shaped electrodes on the fifth electrode plate, thereby forming a plurality of strip-shaped electrode pairs. The step of producing at least a third electrical field between the fourth and fifth electrode plates and conducting a fourth photo-alignment on the third alignment film contains the step of producing an electrical field between each strip-shaped electrode pair and conducting a fifth photo-alignment on the third alignment film.

Each of the first, second, third, fourth, and fifth electrode plates contains a transparent substrate and a transparent electrode layer on the transparent substrate.

The liquid crystal display device contains a display panel and a backlight. The display panel is manufactured by the steps of: providing a first electrode plate, a second electrode plate opposing the first electrode plate, and an array substrate between the first and second electrode plates, where the array substrate contains a first transparent electrode and a first alignment film; producing a first electrical field between the first and second electrode plates, and conducting a first photo-alignment on the first alignment film; providing a third electrode plate and a color film substrate opposing the third electrode plate, where the color film substrate contains a second transparent electrode and a second alignment film, the second alignment film is positioned between the third electrode plate and the second transparent electrode; producing a second electrical field between the third electrode plate and the second transparent electrode, and conducting a second photo-alignment on the second alignment film; and joining the array substrate and the color-film substrate to form the display panel.

In contrast to the prior art, the present disclosure applies electrical fields perpendicular to the alignment films while conducting photo-alignment on the array substrate and the color film substrate. On one hand, the illuminated light during photo-alignment improves the preset angles of liquid crystal molecules in the lateral direction. On the other hand, the vertical electrical field improves the preset angles of liquid crystal molecules in the vertical direction. Through these arrangements, the contrast of the display panel is enhanced.

BRIEF DESCRIPTION OF THE DRAWINGS

To make the technical solution of the embodiments according to the present disclosure, a brief description of the drawings that are necessary for the illustration of the embodiments will be given as follows. Apparently, the drawings described below show only example embodiments of the present disclosure and for those having ordinary skills in the art, other drawings may be easily obtained from these drawings without paying any creative effort. In the drawings.

DETAILED DESCRIPTION OF THE PREFERRED EMBODIMENTS

Figure 1:
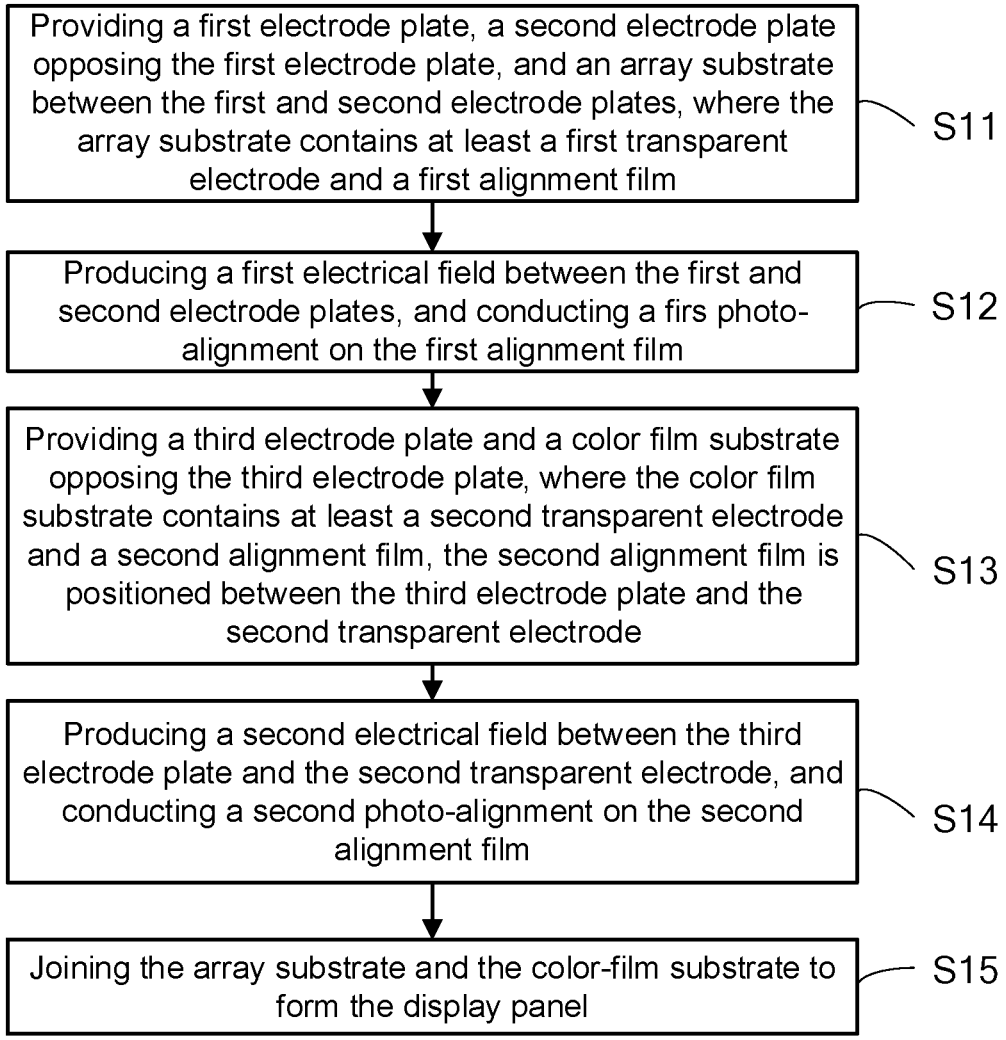
FIG. 1 is a flow diagram showing the steps of a display panel manufacturing method according to a first embodiment of the present disclosure.

FIG. 1 is a flow diagram showing the steps of a display panel manufacturing method according to a first embodiment of the present disclosure. As illustrated, the method contains the following steps.

In step S11, a first electrode plate, a second electrode plate opposing the first electrode plate, and an array substrate between the first and second electrode plates are provided. The array substrate contains at least a first transparent electrode and a first alignment film.

In step S12, a first electrical field is produced between the first and second electrode plates, and a first photo-alignment is conducted on the first alignment film.

Figure 2:
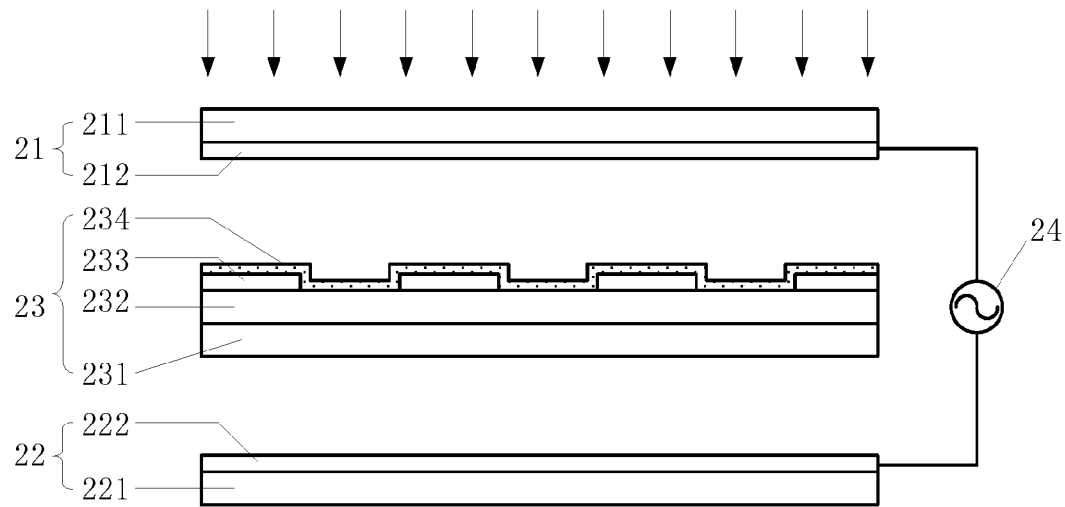
FIG. 2 is a schematic diagram showing the photo-alignment of a array substrate in the method of FIG. 1.

FIG. 2 is a schematic diagram showing the photo-alignment of the array substrate in the method of FIG. 1.

As illustrated, the first electrode plate 21 contains a transparent substrate 211 and a first transparent electrode layer 212, and the second electrode plate 22 contains a transparent substrate 221 and a second transparent electrode layer 222.

Optionally, the transparent substrates 211 and 221 are transparent glass substrates, or transparent plastic substrates. The first and second transparent electrode layers 212 and 222 are made of transparent metal oxides such as Indium Tin Oxide (ITO), and are formed on the transparent substrates using Physical Vapor Deposition (PVD) or Chemical Vapor Deposition (CVD).

The array substrate 23 contains a transparent substrate 231, an insulation layer 232, a first transparent electrode 233, and the first alignment film 234 covering the first transparent electrode 233.

Optionally, between the transparent substrate 231 and the insulation layer 232 can contains additional layers such as thin-film transistors, over-coat layer, common electrode, etc. The present disclosure does not involve these arts and they are not drawn in the drawings.

Optionally, the first transparent electrode is a pixel electrode.

Optionally, the alignment film is usually formed using PI liquid mainly contains polyimide of ultra-violet photo-sensitive group. The PI liquid is a chemical solution for manufacturing LCD alignment film by printing the PI liquid on conductive glass and curing the printed PI liquid into the alignment film. This will give liquid crystal molecules a preset alignment angle and their tilting angles enjoy a better consistency.

In the manufacturing process, a power source 24's two terminals are connected to the first transparent electrode layer 212 and the second transparent electrode layer 222, respectively, thereby producing an electrical field between the first transparent electrode layer 212 and the second transparent electrode layer 222 perpendicular to the array substrate 23. Then, a first light is illuminated on the first alignment film 234 to conduct the first photo-alignment.

Optionally, the first electrical field is an alternating current (AC) electrical field or a direct current (DC) electrical field. The direction of the first electrical field is perpendicular to the array substrate 23. The DC electrical field is better than the AC electrical field in that the former has better steadiness, does not change with time, and is more appropriate to aligning the alignment film. The disadvantage of the DC electrical field is that electrical charges tend to accumulate, thereby adversely affecting the alignment.

Optionally, the first light is a ultra-violet polarized light perpendicularly incident into the array substrate 23. The first light has a polarization direction parallel to the array substrate 23.

As described above, the liquid crystal molecules' preset angles along the lateral direction is improved through the photo-alignment by ultra-violet light, and the liquid crystal molecules' preset angles along the vertical direction is also improved through aligning the first alignment film by electrical field in the vertical direction.

In step S13, a third electrode plate and a color film substrate opposing the third electrode plate are provided. The color film substrate contains at least a second transparent electrode and a second alignment film. The second alignment film is positioned between the third electrode plate and the second transparent electrode.

In step S14, a second electrical field is produced between the third electrode plate and the second transparent electrode, and a second photo-alignment is conducted on the second alignment film.

Figure 3:
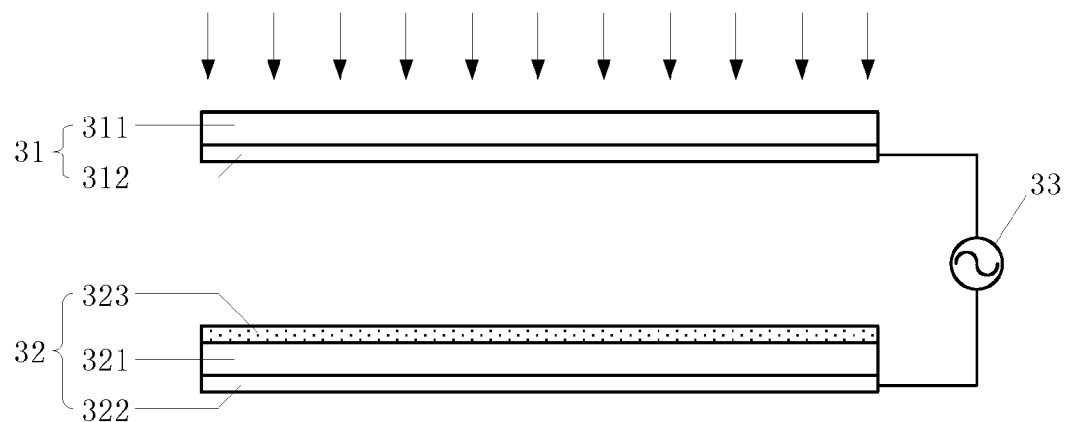
FIG. 3 is a schematic diagram showing the photo-alignment of a color film substrate in the method of FIG. 1.

FIG. 3 is a schematic diagram showing the photo-alignment of the color film substrate in the method of FIG. 1.

As illustrated, the third electrode plate 31 contains a transparent substrate 311 and a third transparent electrode layer 312.

Optionally, the transparent substrate 311 is a transparent glass substrate, or a transparent plastic substrate. The third transparent electrode layer 312 is made of transparent metal oxide such as Indium Tin Oxide (ITO), and is formed on the transparent substrate using PVD or CVD.

The color film substrate 32 contains a transparent substrate 321, the second transparent electrode 322, and the second alignment film 323 to a side of the transparent substrate 321.

Optionally, the color film substrate 32 further contains a color filter.

Optionally, the second transparent electrode 322 is a common electrode.

In the manufacturing process, a power source 33's two terminals are connected to the third transparent electrode layer 312 and the second transparent electrode 322, respectively, thereby forming an electrical field between the third transparent electrode layer 312 and the second transparent electrode 322 perpendicular to the color film substrate 32. Then, a second light is illuminated on the second alignment film 323 to conduct the second photo-alignment.

Optionally, the second electrical field is an alternating current (AC) electrical field or a direct current (DC) electrical field. The direction of the second electrical field is perpendicular to the color film substrate 32.

Optionally, the second light is a ultra-violet polarized light perpendicularly incident into the color film substrate 32. The second light has a polarization direction parallel to the color film substrate 32.

As described above, the liquid crystal molecules' preset angles along the lateral direction is improved through the photo-alignment by ultra-violet light, and the liquid crystal molecules' preset angles along the vertical direction is also improved through aligning the second alignment film by electrical field in the vertical direction.

In step 15, a display panel is formed by joining the array substrate and the color film substrate.

Figure 4:
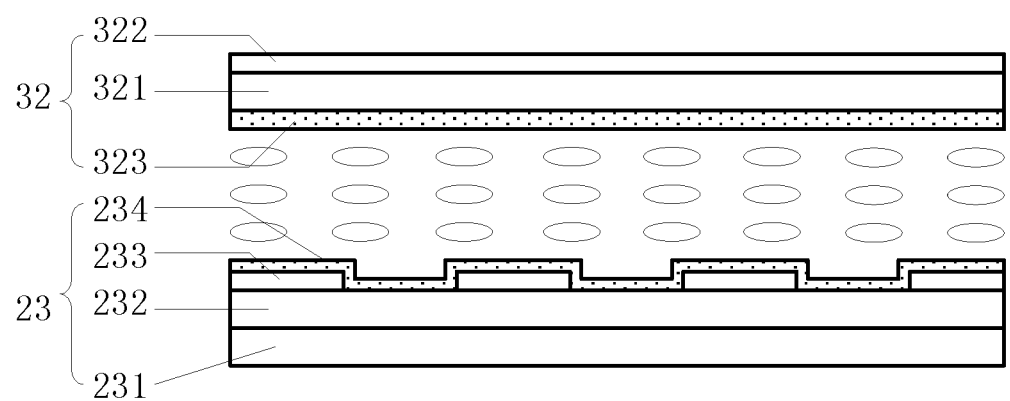
FIG. 4 is a schematic diagram showing the structure of a display panel in the method of FIG. 1.

FIG. 4 is a schematic diagram showing the structure of the display panel in the method of FIG. 1.

As illustrated, the array substrate 23 and the color film substrate 32 are joined together to form the display panel. The first alignment film 234 of the array substrate 23 and the second alignment film 323 of the color film substrate 32 are capable of improving the preset angles of liquid crystal molecules along the vertical and lateral directions.

Compared to the prior art, the present embodiment applies electrical fields perpendicular to the alignment films while conducting photo-alignment on the array substrate and the color film substrate. On one hand, the illuminated light during photo-alignment improves the preset angles of liquid crystal molecules in the lateral direction. On the other hand, the vertical electrical field improves the preset angles of liquid crystal molecules in the vertical direction. Through these arrangements, the contrast of the display panel is enhanced.

Figure 5:
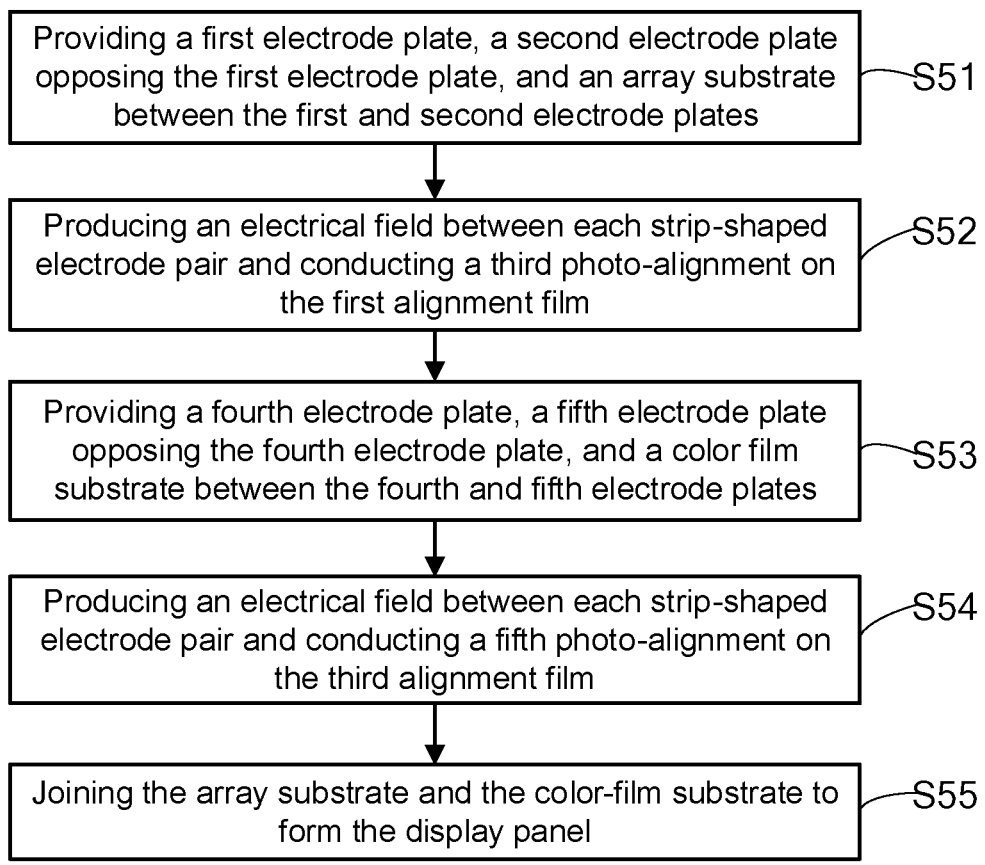
FIG. 5 is a flow diagram showing the steps of a display panel manufacturing method according to a second embodiment of the present disclosure.

FIG. 5 is a flow diagram showing the steps of a display panel manufacturing method according to a second embodiment of the present disclosure. As illustrated, the method contains the following steps.

In step S51, a first electrode plate, a second electrode plate opposing the first electrode plate, and an array substrate between the first and second electrode plates are provided.

Figure 6:
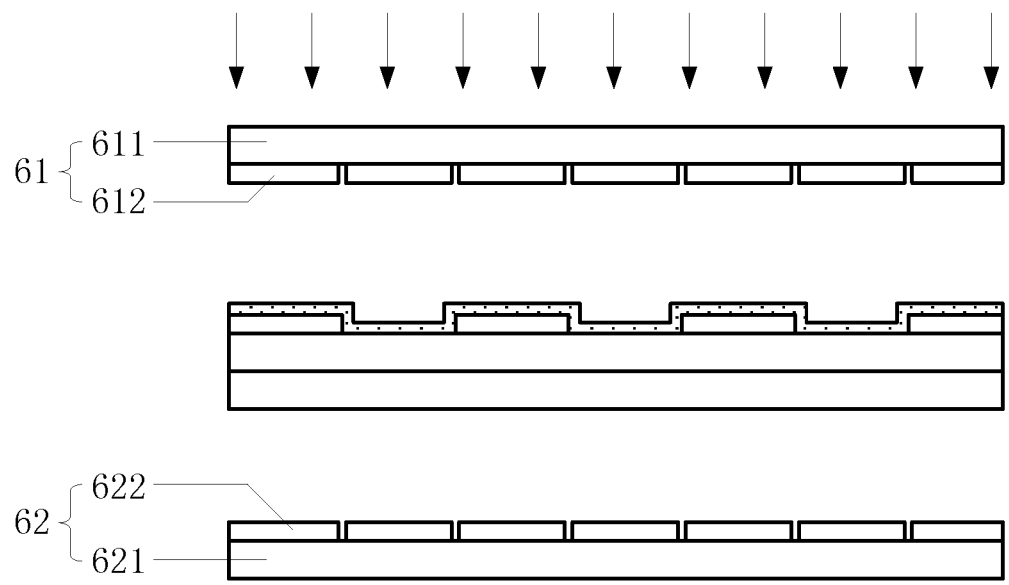
FIG. 6 is a schematic diagram showing the photo-alignment of a array substrate in the method of FIG. 5.
Figure 7:
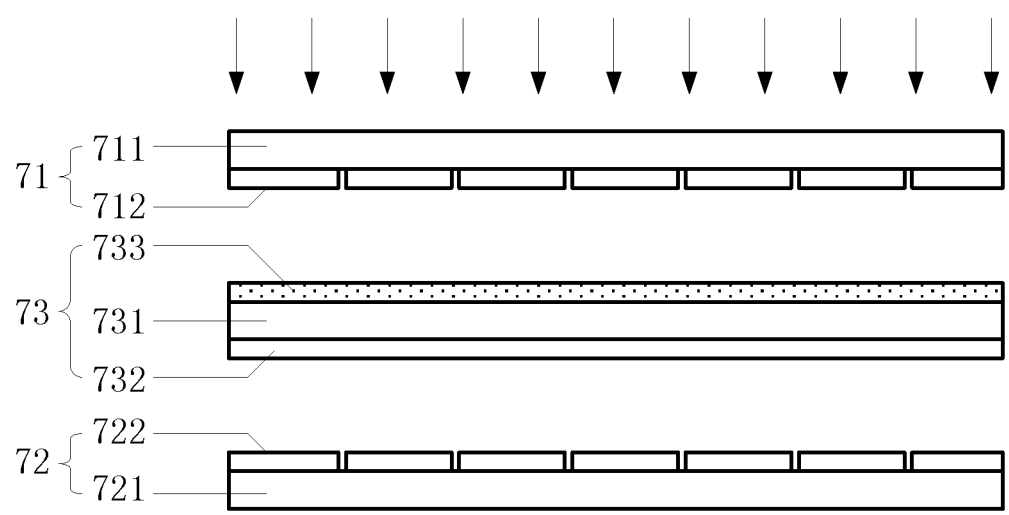
FIG. 7 is a schematic diagram showing the photo-alignment of a color film substrate in the method of FIG. 5.

As shown in FIG. 6, the array substrate 63 contains at least a first transparent electrode 633 and a first alignment film 634.

The first electrode plate 61 contains a transparent substrate 611 and a number of strip-shaped electrodes 612 on the transparent substrate 611, and the second electrode plate 62 contains a transparent substrate 621 and a number of strip-shaped electrodes 622 on the transparent substrate 621. The strip-shaped electrodes 612 and 622 one-to-one correspond to each other, thereby forming a number of strip-shaped electrode pairs.

In step S52, electrical fields are produced between the strip-shaped electrode pairs, and a third photo-alignment is conducted on the first alignment film.

In step S53, a fourth electrode plate, a fifth electrode plate opposing the fourth electrode plate, and a color film substrate between the fourth and fifth electrode plates are provided.

The color film substrate 73 contains at least a third alignment film 733.

The fourth electrode plate 71 contains a transparent substrate 711 and a number of strip-shaped electrodes 712 on the transparent substrate 711, and the fifth electrode plate 72 contains a transparent substrate 721 and a number of strip-shaped electrodes 722 on the transparent substrate 621. The strip-shaped electrodes 712 and 722 one-to-one correspond to each other, thereby forming a number of strip-shaped electrode pairs.

In step S54, electrical fields are produced between the strip-shaped electrode pairs, and a fifth photo-alignment is conducted on the third alignment film.

In step S55, a display panel is formed by joining the array substrate and the color film substrate.

Optionally, the electrical fields from neighboring sets of strip-shaped electrodes are of different strength. In conducting the third photo-alignment, the light illumination direction is also different from the array substrate. Since neighboring sets of strip-shaped electrodes correspond to two separate areas of the third alignment film, the two areas are influenced by different electrical fields and different light illumination directions.

Optionally, the electrical fields from all strip-shaped electrode pairs are of identical strength. In conducting the third photo-alignment, the light illumination direction is different from the array substrate. Since neighboring sets of strip-shaped electrodes correspond to two separate areas of the third alignment film, the two areas are influenced by identical electrical fields and different light illumination directions.

As such, by applying different electrical fields, or by illuminating light of different directions, an alignment film can achieve different preset angles for liquid crystal molecules in different areas. The liquid crystal display panel can have a wider display angle.

The second embodiment is similar to the first embodiment except the shapes of the electrode plates and the distribution of the electrical field strength. The rest of the details are therefore omitted.

Figure 8:
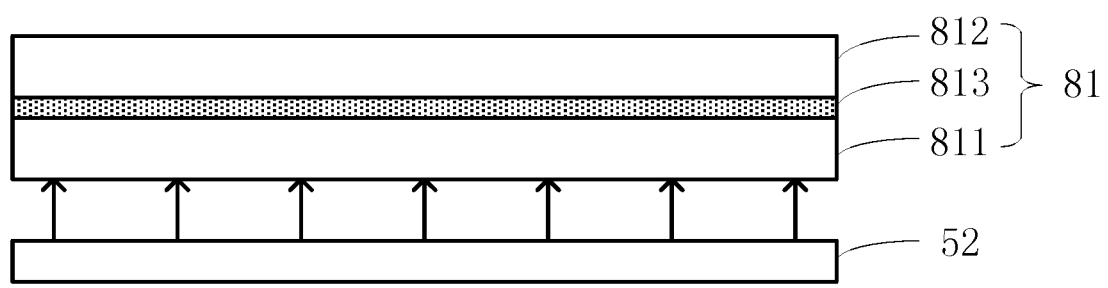
FIG. 8 is a schematic diagram showing a liquid crystal display device according to the present disclosure.

FIG. 8 is a schematic diagram showing a liquid crystal display (LCD) device according to the present disclosure. As illustrated, the LCD device contains a display panel 81 and a backlight 82. The display panel 81 contains an array substrate 811, a color film substrate 812, and a liquid crystal layer 813 between the array substrate 811 and the color film substrate 812.

The display panel 81 is one according to the above-described first or second embodiment. The details are omitted.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A display panel manufacturing method, comprising the steps of:
    providing a first electrode plate, a second electrode plate opposing the first electrode plate, and an array substrate between the first and second electrode plates, where the array substrate comprises a first transparent electrode and a first alignment film;
    producing a first electrical field between the first and second electrode plates perpendicular to the array substrate, and conducting a first photo-alignment on the first alignment film using an ultra-violet light whose polarization direction is parallel to the array substrate, where the first electrical field is an alternating current (AC) electrical field or a direct current (DC) electrical field;
    providing a third electrode plate and a color film substrate opposing the third electrode plate, where the color film substrate comprises a second transparent electrode and a second alignment film, the second alignment film is positioned between the third electrode plate and the second transparent electrode;
    producing a second electrical field between the third electrode plate and the second transparent electrode perpendicular to the color film substrate, and conducting a second photo-alignment on the second alignment film using an ultra-violet light whose polarization direction is parallel to the color film substrate; and
    joining the array substrate and the color-film substrate to form the display panel.

2. The display panel manufacturing method as claimed in claim 1, wherein the first and second electrode plates comprises a plurality of strip-shaped electrodes; the strip-shaped electrodes on the first electrode plate one-to-one correspond to the strip-shaped electrodes on the second electrode plate, thereby forming a plurality of strip-shaped electrode pairs; and the step of producing a first electrical field between the first and second electrode plates and conducting a first photo-alignment on the first alignment film comprises the step of producing an electrical field between each strip-shaped electrode pair and conducting a third photo-alignment on the first alignment film.

3. The display panel manufacturing method as claimed in claim 2, wherein the electrical fields between neighboring strip-shaped electrode pairs are of different strengths.

4. The display panel manufacturing method as claimed in claim 2, wherein neighboring strip-shaped electrode pairs correspond to different areas of the first alignment film; and, in conducting the third photo-alignment, illuminated light is at an angle different from the array substrate.

5. The display panel manufacturing method as claimed in claim 1, wherein
the step of providing a third electrode plate and a color film substrate opposing the third electrode plate comprises the step of providing a fourth electrode plate, a fifth electrode plate opposing the fourth electrode plate, and a color film substrate between the fourth and fifth electrode plates, where the color film substrate comprises a third alignment film; and
the step of producing a second electrical field between the third electrode plate and the second transparent electrode and conducting a second photo-alignment on the second alignment film comprises the step of producing a third electrical field between the fourth and fifth electrode plates and conducting a fourth photo-alignment on the third alignment film.

6. The display panel manufacturing method as claimed in claim 5, wherein the fourth and fifth electrode plates comprises a plurality of strip-shaped electrodes; the strip-shaped electrodes on the fourth electrode plate one-to-one correspond to the strip-shaped electrodes on the fifth electrode plate, thereby forming a plurality of strip-shaped electrode pairs; and the step of producing at least a third electrical field between the fourth and fifth electrode plates and conducting a fourth photo-alignment on the third alignment film comprises the step of producing an electrical field between each strip-shaped electrode pair and conducting a fifth photo-alignment on the third alignment film.

7. The display panel manufacturing method as claimed in claim 5, wherein each of the first, second, third, fourth, and fifth electrode plates comprise a transparent substrate and a transparent electrode layer on the transparent substrate.

8. A display panel manufacturing method, comprising the steps of:
providing a first electrode plate, a second electrode plate opposing the first electrode plate, and an array substrate between the first and second electrode plates, where the array substrate comprises a first transparent electrode and a first alignment film;
producing a first electrical field between the first and second electrode plates, and conducting a first photo-alignment on the first alignment film;
providing a third electrode plate and a color film substrate opposing the third electrode plate, where the color film substrate comprises a second transparent electrode and a second alignment film, the second alignment film is positioned between the third electrode plate and the second transparent electrode;
producing a second electrical field between the third electrode plate and the second transparent electrode, and conducting a second photo-alignment on the second alignment film; and
joining the array substrate and the color-film substrate to form the display panel.

9. The display panel manufacturing method as claimed in claim 8, wherein the first and second electrical fields are AC electrical fields or DC electrical fields; the first electrical field is perpendicular to the array substrate; and the second electrical field is perpendicular to the color film substrate.

10. The display panel manufacturing method as claimed in claim 8, wherein the first photo-alignment utilizes a ultra-violet light whose polarization direction is parallel to the array substrate; and the second photo-alignment utilizes a ultra-violet light whose polarization direction is parallel to the color film substrate.

11. The display panel manufacturing method as claimed in claim 8, wherein the first and second electrode plates comprises a plurality of strip-shaped electrodes; the strip-shaped electrodes on the first electrode plate one-to-one correspond to the strip-shaped electrodes on the second electrode plate, thereby forming a plurality of strip-shaped electrode pairs; and the step of producing a first electrical field between the first and second electrode plates and conducting a first photo-alignment on the first alignment film comprises the step of producing an electrical field between each strip-shaped electrode pair and conducting a third photo-alignment on the first alignment film.

12. The display panel manufacturing method as claimed in claim 11, wherein the electrical fields between neighboring strip-shaped electrode pairs are of different strengths.

13. The display panel manufacturing method as claimed in claim 11, wherein neighboring strip-shaped electrode pairs correspond to different areas of the first alignment film; and, in conducting the third photo-alignment, illuminated light is at an angle different from the array substrate.

14. The display panel manufacturing method as claimed in claim 8, wherein
the step of providing a third electrode plate and a color film substrate opposing the third electrode plate comprises the step of providing a fourth electrode plate, a fifth electrode plate opposing the fourth electrode plate, and a color film substrate between the fourth and fifth electrode plates, where the color film substrate comprises a third alignment film; and
the step of producing a second electrical field between the third electrode plate and the second transparent electrode and conducting a second photo-alignment on the second alignment film comprises the step of producing a third electrical field between the fourth and fifth electrode plates and conducting a fourth photo-alignment on the third alignment film.

15. The display panel manufacturing method as claimed in claim 14, wherein the fourth and fifth electrode plates comprises a plurality of strip-shaped electrodes; the strip-shaped electrodes on the fourth electrode plate one-to-one correspond to the strip-shaped electrodes on the fifth electrode plate, thereby forming a plurality of strip-shaped electrode pairs; and the step of producing at least a third electrical field between the fourth and fifth electrode plates and conducting a fourth photo-alignment on the third alignment film comprises the step of producing an electrical field between each strip-shaped electrode pair and conducting a fifth photo-alignment on the third alignment film.

16. The display panel manufacturing method as claimed in claim 14, wherein each of the first, second, third, fourth, and fifth electrode plates comprise a transparent substrate and a transparent electrode layer on the transparent substrate.

17. A liquid crystal display device, comprising a display panel and a backlight, wherein the display panel is manufactured by the steps of:
providing a first electrode plate, a second electrode plate opposing the first electrode plate, and an array substrate between the first and second electrode plates, where the array substrate comprises a first transparent electrode and a first alignment film;
producing a first electrical field between the first and second electrode plates, and conducting a first photo-alignment on the first alignment film;

providing a third electrode plate and a color film substrate opposing the third electrode plate, where the color film substrate comprises a second transparent electrode and a second alignment film, the second alignment film is positioned between the third electrode plate and the second transparent electrode;

producing a second electrical field between the third electrode plate and the second transparent electrode, and conducting a second photo-alignment on the second alignment film; and joining the array substrate and the color-film substrate to form the display panel.

\* \* \* \* \*